(12) United States Patent
Chang et al.

(10) Patent No.: US 10,108,555 B2
(45) Date of Patent: Oct. 23, 2018

(54) MEMORY SYSTEM AND MEMORY MANAGEMENT METHOD THEREOF

(71) Applicant: MACRONIX INTERNATIONAL CO., LTD., Hsinchu (TW)

(72) Inventors: Yu-Ming Chang, Pingtung County (TW); Yuan-Hao Chang, Taipei (TW); Hsiu-Chang Chen, Tainan (TW); Tei-Wei Kuo, New Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 27 days.

(21) Appl. No.: 15/370,059

(22) Filed: Dec. 6, 2016

(65) Prior Publication Data

US 2017/0344300 A1  Nov. 30, 2017

Related U.S. Application Data

(60) Provisional application No. 62/341,635, filed on May 26, 2016.

(51) Int. Cl.
*G06F 12/02* (2006.01)
*G06F 12/121* (2016.01)
(Continued)

(52) U.S. Cl.
CPC ............ *G06F 12/121* (2013.01); *G06F 12/00* (2013.01); *G06F 12/0246* (2013.01);
(Continued)

(58) Field of Classification Search
CPC .... G06F 3/068; G06F 3/0685; G06F 12/0638; G06F 2212/205; G06F 2212/217; G11C 16/349–16/3495
See application file for complete search history.

(56) References Cited

U.S. PATENT DOCUMENTS

2009/0193184 A1  7/2009  Yu et al.
2010/0169602 A1*  7/2010  Hulbert ............... G06F 12/0246
                                              711/165
(Continued)

OTHER PUBLICATIONS

Keun Soo Yim. "A Novel Memory Hierarchy for Flash Memory Based Storage Systems." Dec. 2005. Journal of Semiconductor Technology and Science. vol. 5. pp. 262-269.*
(Continued)

*Primary Examiner* — Nathan Sadler
(74) *Attorney, Agent, or Firm* — McClure, Qualey & Rodack, LLP (57) ABSTRACT

A memory management method includes: providing a hybrid memory comprising a first type memory and a second type memory; providing an inactive list and a read active list for recording in-used pages on the first type memory; providing a write active list for recording in-used pages on the second type memory; allocating a page from the first type memory according to a system request, and inserting the page into the inactive list accordingly; moving the page from the inactive list to the write active list or the read active list in response to two or more successive access operations on the page; and referring the page to a physical address on the second type memory when the page is in the write active list.

20 Claims, 6 Drawing Sheets

(51) Int. Cl.
 *G06F 12/00* (2006.01)
 *G06F 12/06* (2006.01)
 *G06F 12/1009* (2016.01)
(52) U.S. Cl.
 CPC ...... *G06F 12/0638* (2013.01); *G06F 12/1009* (2013.01); *G06F 2212/1016* (2013.01); *G06F 2212/205* (2013.01); *G06F 2212/7208* (2013.01)

(56) References Cited

U.S. PATENT DOCUMENTS

| | | | |
|---|---|---|---|
| 2010/0312955 A1* | 12/2010 | Hwang | G06F 12/121 711/105 |
| 2012/0054421 A1* | 3/2012 | Hiratsuka | G06F 12/0246 711/103 |
| 2014/0006688 A1 | 1/2014 | Yu et al. | |
| 2014/0201423 A1 | 7/2014 | Jean et al. | |
| 2015/0058525 A1* | 2/2015 | Venkata | G06F 12/0866 711/103 |
| 2015/0106556 A1 | 4/2015 | Yu et al. | |
| 2016/0070474 A1 | 3/2016 | Yu et al. | |
| 2016/0239383 A1* | 8/2016 | Feng | G06F 12/0246 |
| 2017/0139768 A1* | 5/2017 | Camp | G06F 11/108 |
| 2017/0286288 A1* | 10/2017 | Higgins | G06F 12/0246 |
| 2017/0357450 A1* | 12/2017 | Barbou-Des-Places | G06F 3/0604 |

OTHER PUBLICATIONS

Ramos et al. "Page Placement in Hybrid Memory Systems." Jun. 2011. ACM. ICS '11. pp. 85-95.*
Wu et al. "APP-LRU: A New Page Replacement Method for PCM/DRAM-Based Hybrid Memory Systems." Sep. 2014. Springer. Lecture Notes in Computer Science. vol. 8707. pp. 84-95.*
Sohail et al. "MigrantStore: Leveraging Virtual Memory in DRAM-PCM Memory Architecture." Apr. 2015. https://arxiv.org/pdf/1504.04297.*
Wang et al. "Observational Wear Leveling: An Efficient Algorithm for Flash Memory Management." Jun. 2012. ACM. DAC 2012. pp. 235-242.*

* cited by examiner

MEMORY SYSTEM AND MEMORY MANAGEMENT METHOD THEREOF

This application claims the benefit of U.S. provisional application Ser. No. 62/341,635, filed May 26, 2016, the subject matter of which is incorporated herein by reference.

TECHNICAL FIELD

The disclosure relates in general to a memory system and a memory management method thereof.

BACKGROUND

Due to the shrinking barrier of DRAM and the heavy burden of power consumption, modern computing systems are thirsting for a better alternative of working memory. In order to further seek for a low cost environment, multi-level-cell (MLC) is a solution to double the memory capacity by storing two-bit information in each memory cell. However, the use of MLC usually degrades the access performance and the endurance of memory cells significantly.

Therefore, there is a need to achieve a compromise between the cost and the performance.

SUMMARY

The disclosure is directed to a memory system and a memory management method thereof. The proposed memory system adopts a hybrid memory that includes a first type memory with relatively high capacity and a second type memory with relatively high access efficiency. The system performance in terms of the write speed and the lifetime can be optimized by taking advantages of both the high capacity of the first type memory and the high performance of the second type memory.

According to one embodiment of the present disclosure, a memory management method is provided. The memory management method includes: providing a hybrid memory comprising a first type memory and a second type memory, wherein the first type memory has higher capacity than the second type memory, and the second type memory has higher access efficiency than the first type memory; providing an inactive list and a read active list for recording in-used pages on the first type memory; providing a write active list for recording in-used pages on the second type memory; allocating a page from the first type memory according to a system request, and inserting the page into the inactive list accordingly; moving the page from the inactive list to the write active list or the read active list in response to two or more successive access operations on the page; and referring the page to a physical address on the second type memory when the page is in the write active list.

According to another embodiment of the present disclosure, a memory system is provided. The memory system includes a hybrid memory, an inactive list, a read active list, a write active list, a write-aware page manager and a memory management unit (MMU). The hybrid memory includes a first type memory and a second type memory, wherein the first type memory has higher capacity than the second type memory, and the second type memory has higher access efficiency than the first type memory; the inactive list and a read active list are for recording in-used pages on the first type memory; the write active list is for recording in-used pages on the second type memory; the write-aware page manager is configured for: allocating a page from the first type memory according to a system request and inserting the page into the inactive list accordingly, and moving the page from the inactive list to the write active list or the read active list in response to two or more successive access operations on the page; the MMU is for referring the page to a physical address on the second type memory when the page is in the write active list.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the specification, some embodiments of the present disclosure are described with reference to accompanying drawings. It should be noted that not all embodiments are illustrated in accompanying drawings. In fact, the present disclosure can have different variations and is not limited to the embodiments exemplified below. Relatively, the present disclosure provides a number of embodiments to satisfy the legal requirements in regard of application. Identical designations are used in the drawings to indicate identical or similar elements.

Figure 1:
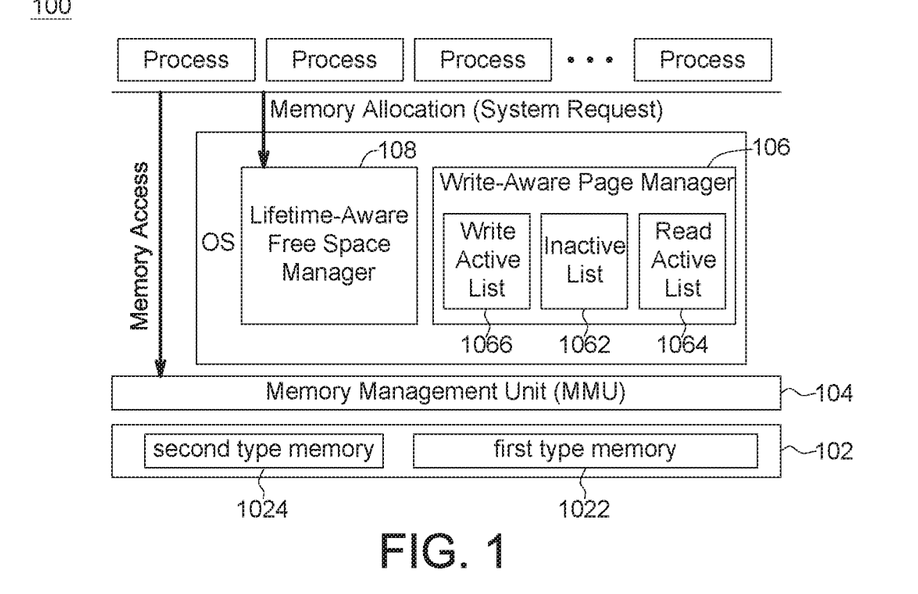
FIG. 1 illustrates a memory system according to an embodiment of the present disclosure.

FIG. 1 illustrates a memory system 100 according to an embodiment of the present disclosure. The memory system 100 includes a hybrid memory 102, a memory management unit (MMU) 104, a write-aware page manager 106 and optionally a lifetime-aware free space manager 108.

In an embodiment, the hybrid memory 102 is the main memory of the memory system 100, the MMU 104 is a hardware component built in the central processing unit (CPU), and the write-aware page manager 106 and the lifetime-aware free space manager 108 are implemented in the operating system (OS).

The hybrid memory 102 mainly includes a first type memory 1022 and a second type memory 1024, wherein the first type memory 1022 has higher capacity than the second type memory 1024, and the second type memory 1024 has higher access efficiency than the first type memory 1022. The access efficiency can be evaluated by various ways, such latency or bandwidth. For example, high access efficiency can be understood as low latency or high bandwidth.

The first type memory 1022 and the second type memory 1024 can be chosen based on the trade-off between the performance and the cost of the system. In an embodiment, the first type memory 1022 is a multi-level-cell (MLC)

memory and the second type memory 1024 is a single-level cell (SLC) memory. In another embodiment, the first type memory 1022 is a SLC memory and the second type memory 1024 is a dynamic random access memory (DRAM).

The MMU 104 may translate the virtual addresses issued by running processes to the corresponding physical addresses in the hybrid memory 102. The address translation performed by the MMU 104 depends on the content of a page table which is mainly manipulated/maintained by the write-aware page manager 106 and/or the lifetime-aware free space manager 108.

The write-aware page manager 106 may perform deallocation or reclamation on in-used pages as the free memory space is insufficient. For example, a page is a basic management unit in the OS.

According to the proposed method, the write-aware page manager 106 may exploit three lists, namely inactive list 1062, read active list 1064, and write active list 1066, to manage all in-used pages which have different access behavior, to maximize the number of frequently-written pages on the second type memory 1024 and to minimize the number of frequently-written pages on the first type memory 1022. Both the inactive list 1062 and the read active list 1064 are for recording in-used pages on the first type memory 1022, and the write active list 1066 is for recording in-used pages on the second type memory 1024. In an embodiment, each list may manage its own pages with least-recently-used (LRU) fashion.

The pages in the write active list 1066 are expected to receive more write operations, while the pages in the read active list 1064 are expected to be read more likely. The pages that are less likely written and read would be put in the inactive list 1062. With such a classification, the in-used pages in the write active list 1066 will be allocated from the second memory 1024 to offset the adverse impact on the performance because of the relatively long write latency of the first type memory 1022. For the pages in the read active list 1064 or the inactive list 1062, they are put in the first type memory 1022 which has a larger space and a moderate access performance.

The rationale behind this design is two fold. First, the read performance of the first type memory 1022 (e.g., a MLC phase change memory (PCM)) is comparable with that of the second type memory 1024 (e.g., SLC PCM) such that the frequently-read pages in the first type memory 1022 could still sustain an acceptable read performance. Second, typical access patterns on a main memory are considerably skew, which implies that most of the pages are not accessed frequently and therefore suitable to be stored in the first type memory 1022.

The lifetime-aware free space manager 108 is presented to extend the effective system lifetime. According to the proposed disclosure, the lifetime-aware free space manager 108 may preferentially allocate young pages and avoid the allocation of old pages, where young (resp. old) means that a page undergoes a small (resp. large) number of write times.

Figure 2:
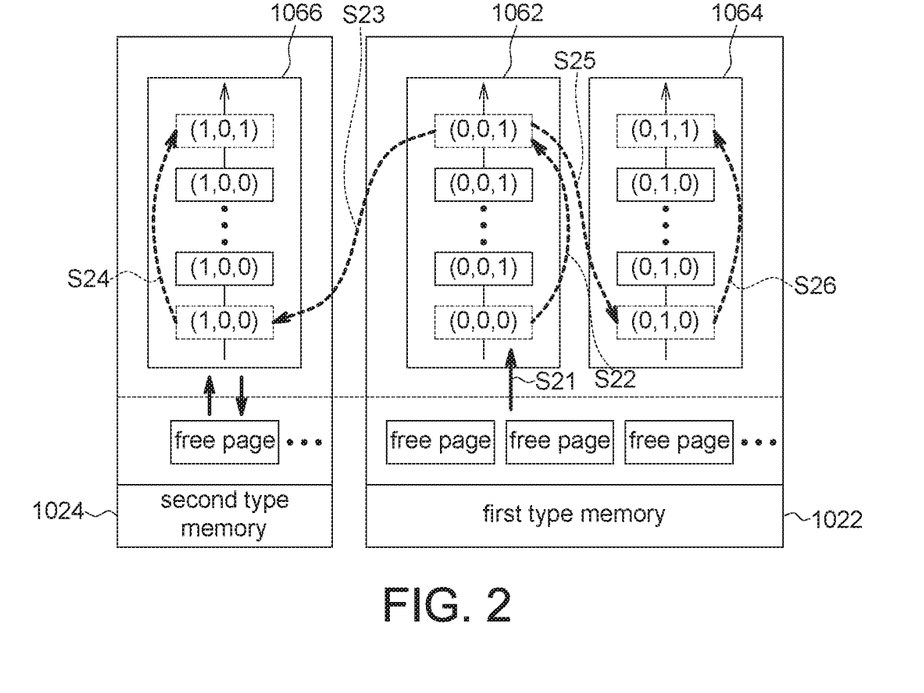
FIG. 2 illustrates an example of page access flow.

FIG. 2 illustrates an example of page access flow in accordance with a proposed data structure including the inactive list 1062, the read active list 1064 and the write active list 1066. These lists 1062, 1064 and 1066 can be stored in the hybrid memory 102 and/or any other external storage device.

According to the proposed method, the write-aware page manager 106 may firstly allocate a page from the first type memory 1022 according to a system request, and inserts the page into the inactive list 1062 accordingly. The system request for memory allocation may come from one or more processes executed in an application layer. The write-aware page manager 106 may further move the page from the inactive list 1062 to the write active list 1064 or the read active list 1066 in response to two or more successive access operations on the page, causing the MMU 104 to refer the page to a physical address on the second type memory 1024. For example, the MMU 104 may update the logical and physical address mapping to configure the page to point/refer to a new physical address on the second type memory 1024.

Each in-used page is assigned for a descriptor to identify its access behavior. Each descriptor may include a first flag, a second flag and a third flag, where the first flag indicates whether the corresponding page is in the write active list 1062 or not, the second flag indicates whether the corresponding page is in the read active list 1064 or not, and the third flag reflects the frequency of access operations on the corresponding page, in accordance with second-chance strategy for example.

Each of the inactive list 1062, the read active list 1064 and the write active list 1066 may record the descriptors of pages therein. As shown in FIG. 2, each list includes descriptors presented in a form of ("first flag", "second flag", "third flag"), where symbol "1" means the corresponding flag is set, and symbol "0" means the corresponding flag is clear. Thus, for each page in the write active list 1066 (resp. the read active list 1064), its first flag (resp. the second flag) is represented as "1", and for each page in the inactive list 1062, both the first and second flags are represented as "0".

In the example of FIG. 2, each of the steps S21-S26 has a corresponding "Access" arrow. When a page is accessed for the first time, it will be allocated from the first type memory 1022, inserted into the inactive list 1062, and with all of its flags clear, i.e., (0, 0, 0) (Step S21).

The next access operation (read/write operation) on the same page will set its third flag, i.e., (0, 0, 1), and this page will still stay in the same list, i.e., inactive list 1062 (Step S22). Such a management design is able to avoid the unnecessary moving of page data among different lists, or rather different memories, e.g., the first and second type memories 1022 and 1024. This is because many applications such as video streaming usually have one-time-access property; more specifically, many pages allocated for this kind of applications are accessed once till the end. Therefore, these pages shall not be mistakenly identified as frequently-accessed pages, and be even moved to the second type memory 1024.

The page moving between the inactive list 1062 and the read active list 1064 only involves the modification of pointers and flags because both two lists 1062 and 1064 are referring to the same memory, i.e., the first type memory 1022. On the contrary, the page moving between the inactive list 1062/the read active list 1064 and the write active list 1066 requires an extra operation to copy page data. That is, a page's data stored in the first type memory 1022 will be copied to the second type memory 1024 when the page is moved from the inactive list 1062/the read active list 1064 to the write active list 1066.

When an accessed page in the inactive list 1062 is accessed again, this page more likely contains hot data and should be moved to one of the read active list 1064 and the write active list 1066.

If the access is a write operation, the page will be moved to the write active list 1066 and the data of the accessed page will be copied to a free page in the second type memory 1024. The allocation of the free page from the second type memory 1024 may be determined by the lifetime-aware free space manager 108 for example. Then, the page is inserted into the write active list 1066, and the corresponding flags are set to (1, 0, 0) (Step S23). The rationale behind this design is that the accessed data might be written several times in the near future from the prediction of the third flag, i.e., an accessed page in the inactive list 1062 is written. In addition, the latency of a write operation is relatively longer than that of a read operation so that the operation should be given a high priority to use the second type memory 1024 for the performance consideration.

On the contrary, if the access is a read operation, the moving destination depends on the number of free pages in the second type memory 1024. If the number of free pages is sufficient, the page can be moved to the second type memory 1024 directly, and inserted into the write active list 1066. This design can further improve the read performance even these pages have lower probability to be written. Otherwise, the page will remain in the first type memory 1022, and be inserted into the read active list 1064 (Step S25).

The successive access operations on the pages in the write active list 1066 or the read active list 1064 will set the third flag the same (Step 24/26), except that the accessed page is in the write active list 1066 and the access is a read operation. In this way, the write active list 1066's pages on which the data turn less-written can be swapped to the first type memory 1022 more easily since a page with the third flag clear ("0") will be reclaimed first.

Figure 3:
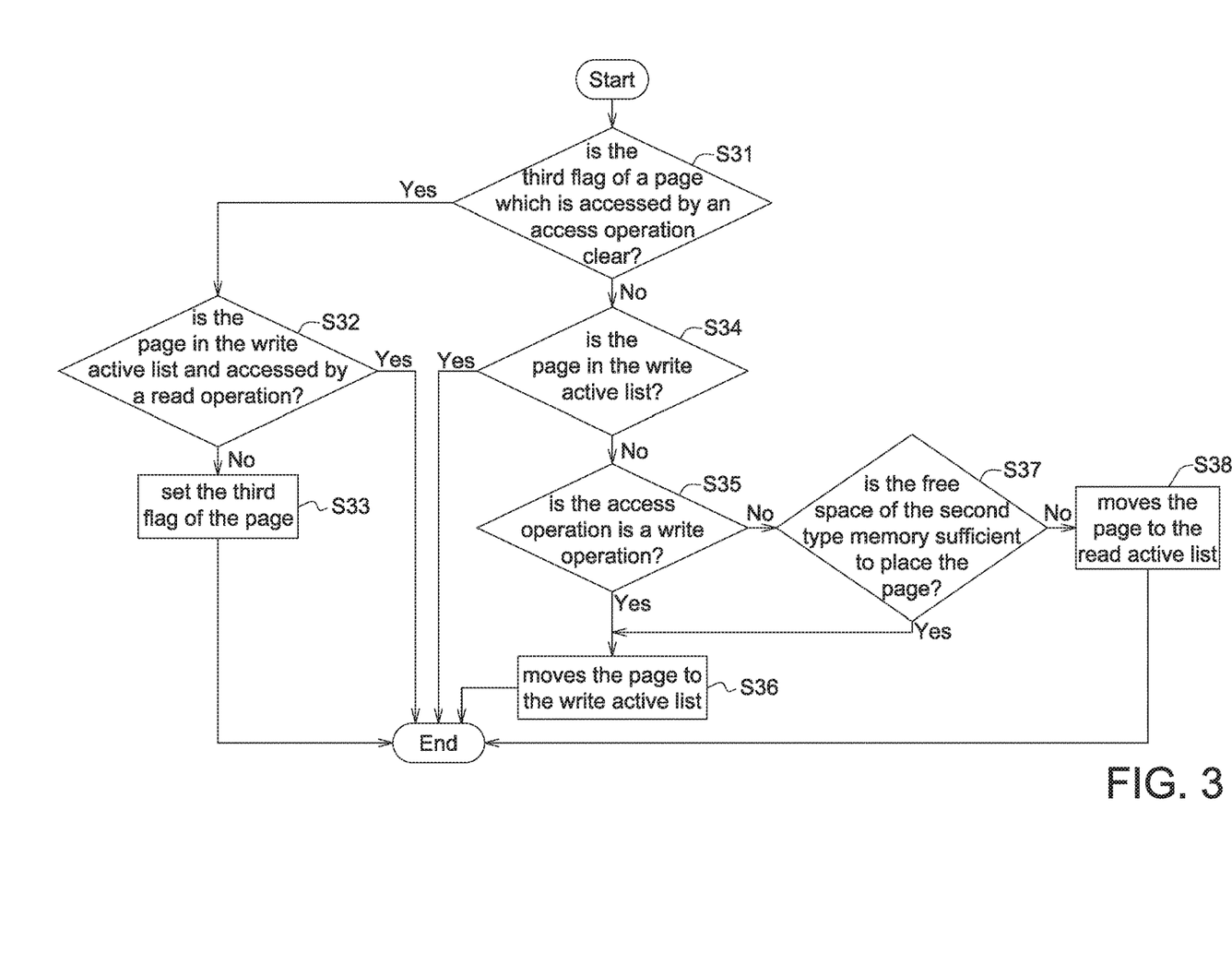
FIG. 3 shows a flow chart illustrating the proposed page access flow shown in FIG. 2.

FIG. 3 shows a flow chart illustrating the proposed page access flow shown in FIG. 2.

First, the write-aware page manager 106 checks whether the third flag of a page which is accessed by an access operation is clear (Step S31). If yes, the write-aware page manager 106 then checks whether the page is in the write active list 1066 and accessed by a read operation (Step S32). If not, the page will remain in the same list and its third flag will be set (Step S33). Otherwise, the third flag of the page remains clear.

If the determination result at step S31 is negative, i.e., the page with the third flag set ("1") is accessed, it implies that the data on the page are most likely hot and is good to be put on the second type memory 1024. At this time, the write-aware page manager 106 checks whether this page is in the write active list 1066 (Step S34). If yes, this page will keep the same state without further operations. If not, the write-aware page manager 106 continues to check whether the access operation is a write operation (Step S35).

If the access operation is a write operation, the write-aware page manager 106 moves this page to the write active list 1066 directly (Step S36). That is, the write-aware page manager 106 may move a page into the write active list 1066 in response to a write operation on the page when the third flag of the page is set and the page is not in the write active list 1066.

On the other hand, if the access operation is not a write operation (e.g., a read operation), the write-aware page manager 106 then determines whether the free space on the second type memory 1024 is sufficient to place the page (Step S37). If yes, the page is moved to the write active list 1066 as well. Otherwise, the page remains in the same memory, i.e., the first type memory 1022, and is moved to the read active list 1064 if this page is in the inactive list 1062 originally (Step S38).

Simply to say, when the third flag of the page is set and the page is in the read active list 1064 or the inactive list 1062, the write-aware page manager 106 will move the page into the write active list 1066 in response to a read operation on the page if the free space of the second type memory 1024 is sufficient to place the page. Otherwise, the write-aware page manager 106 moves the page into the read active list 1064 in response to the read operation.

Figure 4:
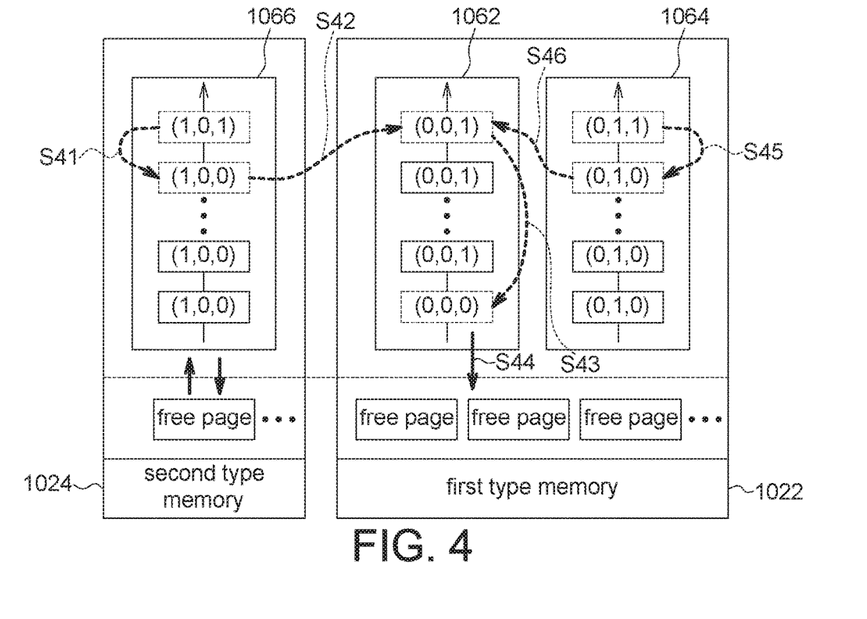
FIG. 4 illustrates an example of page reclaiming flow.

FIG. 4 illustrates an example of page reclaiming flow in accordance with a proposed data structure including the inactive list 1062, the read active list 1064, and the write active list 1066.

In this example, the write-aware page manager 106 may find out least-recently-used page data and reclaim their corresponding pages to release more space for accommodating other hot data, and move data which has become cold in the write active list 1066 to the first type memory 1022 so as to avoid the unnecessary space occupancy of the second type memory 1024.

In the example of FIG. 4, each step from S41-S46 has a corresponding "Timeout" arrow. If a page with the third flag set (e.g., "1") is selected to be reclaimed by the write-aware page manager 106, the page's third flag will be clear immediately no matter which lists the page stays. Or, if a page, in which its third flag has been set in either the write active list 1066 or the read active list 1064, is found that it has not been accessed by an access operation for a certain period of time (third period of time), it will remain the same list with the third flag clear (Steps S41, S45).

If the residing page data become cold, this page will have a higher probability to be moved to the first type memory 1022, or be reclaimed and swapped out. Therefore, if a page, in which its third flag has been clear in either the write active list 1066 or the read active list 1064, is found that it has not been accessed by a access operation for a certain period of time (second period of time), it will be moved to the inactive list 1062 (Steps S42, S46). Since this kind of page is just swapped out from one of the write active list 1066 or the read active list 1064, it might be quickly accessed again. Thus, its third flag is set again. Finally, if a page with all flags clear (Step S43), i.e., (0, 0, 0), is found that it has not been accessed for a period of time (first period of time), this page is reclaimed and its data is moved to the swap space to return a free page (Step S44). The lengths of the first, second and third periods of time can be designed individually, depending on the practical uses.

Figure 5:
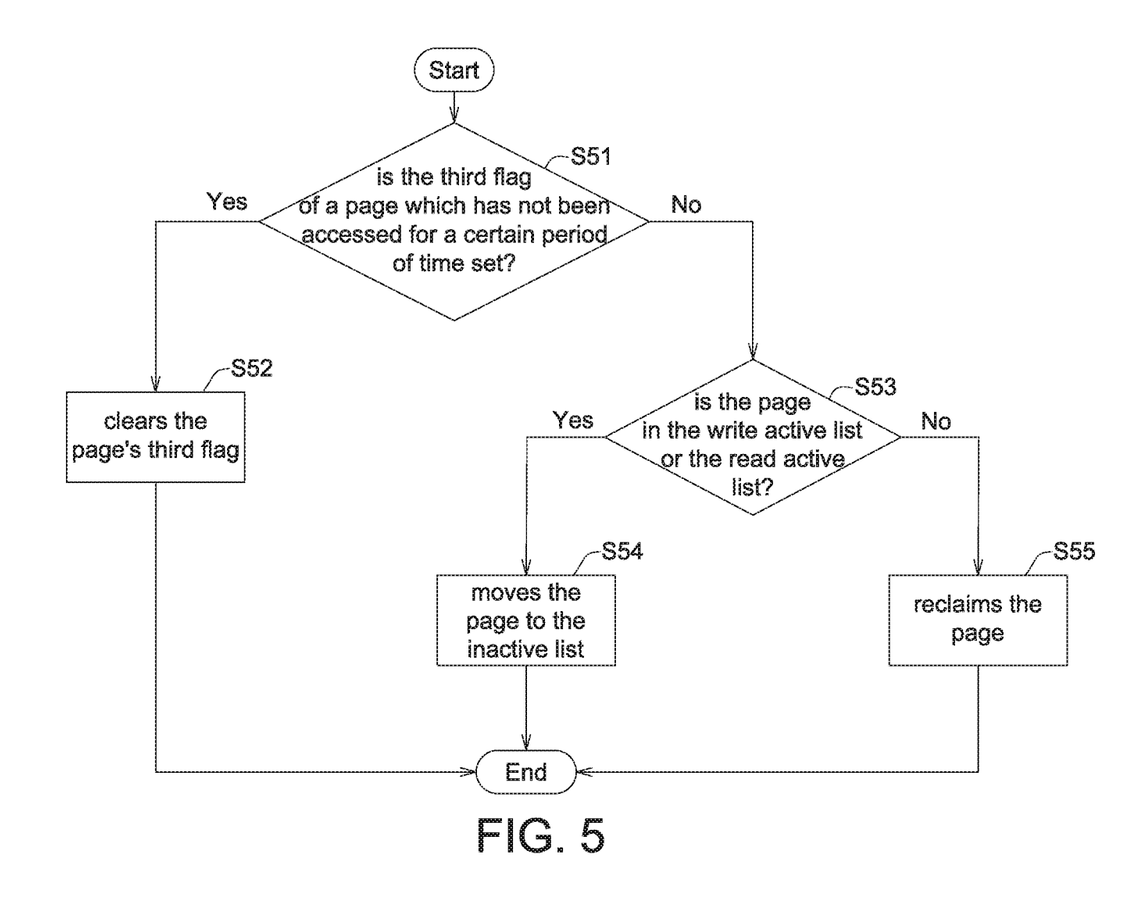
FIG. 5 shows a flow chart illustrating the proposed page reclaiming flow shown in FIG. 4.

FIG. 5 shows a flow chart illustrating the proposed page reclaiming flow shown in FIG. 4.

First, the write-aware page manager 106 checks whether the third flag of a page which has not been accessed for a certain period of time is set (Step S51). If yes, the write-aware page manager 106 clears the page's third flag (Step S52). If not, the write-aware page manager 106 checks whether the page is in the write active list 1066 or the read active list 1064 (Step S53). If yes, the write-aware page manager 106 moves the page to the inactive list 1062 (Step 54). If not, i.e., the page is in the inactive list 1062, the page will be reclaimed and swapped out from the memory (Step S55).

The lifetime-aware free space manager 108 may preferentially allocate young pages and avoid the allocation of old pages to extend the effective system lifetime. To this end, a lifetime-aware heap tree for the lifetime-aware free space manager 108 is proposed to manage and be able to inquire the age (write times) of pages very efficiently. As a result, each memory page allocation, e.g., Step 21 of FIG. 2, or deallocation, e.g., Step 44 of FIG. 4 can refer to the lifetime-aware heap tree to finish the page classification with ease.

Figure 6:
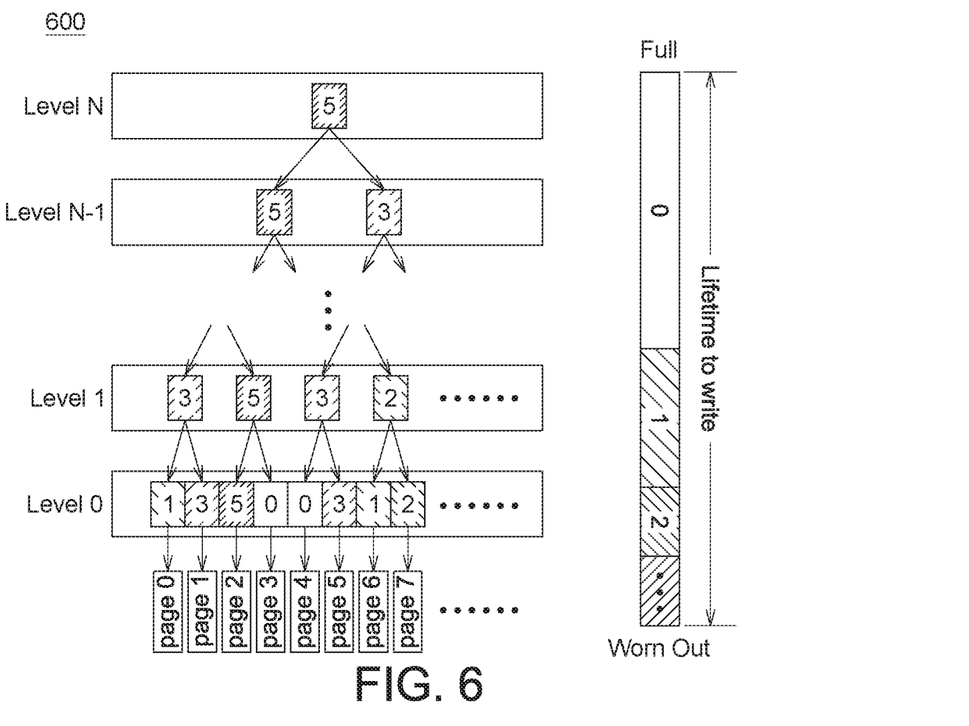
FIG. 6 shows an example of the proposed lifetime-aware heap tree using by the lifetime-aware free space manager.

FIG. 6 shows an example of the proposed lifetime-aware heap tree 600 using by the lifetime-aware free space manager 108. The lifetime-aware heap tree 600 is able to inquire the oldest age, i.e., maximum number of writes, among a group of continuous pages, where the number of pages in a group ranges from $2^0$ to $2^N$, N is a positive integer, and $2^N$ is the size of managed memory.

The node in a level N of the lifetime-aware heap tree 600 stores the lifetime of the oldest page for a group with $2^N$ continuous pages. The lifetime-aware heap tree 600 is a binary tree and the value stored in each node is either greater than or equal to that of its children node. For example, the second node in the level 1 of the lifetime-aware heap tree 600 manages $2^1$ continuous pages, i.e., page 2 and page 3, and its stored value, i.e., 5, is obtained from its children, i.e., page 2, which has a greater value.

Similarly, the node in the top level (level N in this example) of the lifetime-aware heap tree 600 stores the largest value of lifetime for the entire memory space. Thus, the lifetime-aware free space manager 108 is able to easily compare the lifetime of two groups with any number of continuous pages by using the proposed lifetime-aware heap tree 600.

In an embodiment, each of the first type memory 1022 and the second type memory 1024 may have its lifetime-aware heap tree 600.

In addition, to greatly reduce the maintenance cost, e.g., frequent update due the intensive writes on memory pages, for the lifetime-aware heap tree 600, a new definition of lifetime is proposed to record how old a page is.

As shown in the right part of FIG. 6, the value 0 represents that the corresponding page has at most $$\frac{1}{2^0}$$

of lifetime to write, the value 1 represents that the corresponding page has at most $$\frac{1}{2^1}$$

of lifetime to write, and so on. The larger the value is, the older the page will be. The rationale behind this design is that it can mitigate the management overhead for frequently updated young pages and more precisely observe the increase of writes for old pages, especially when an old page is close to be worn out and might crash a system.

Figure 7:
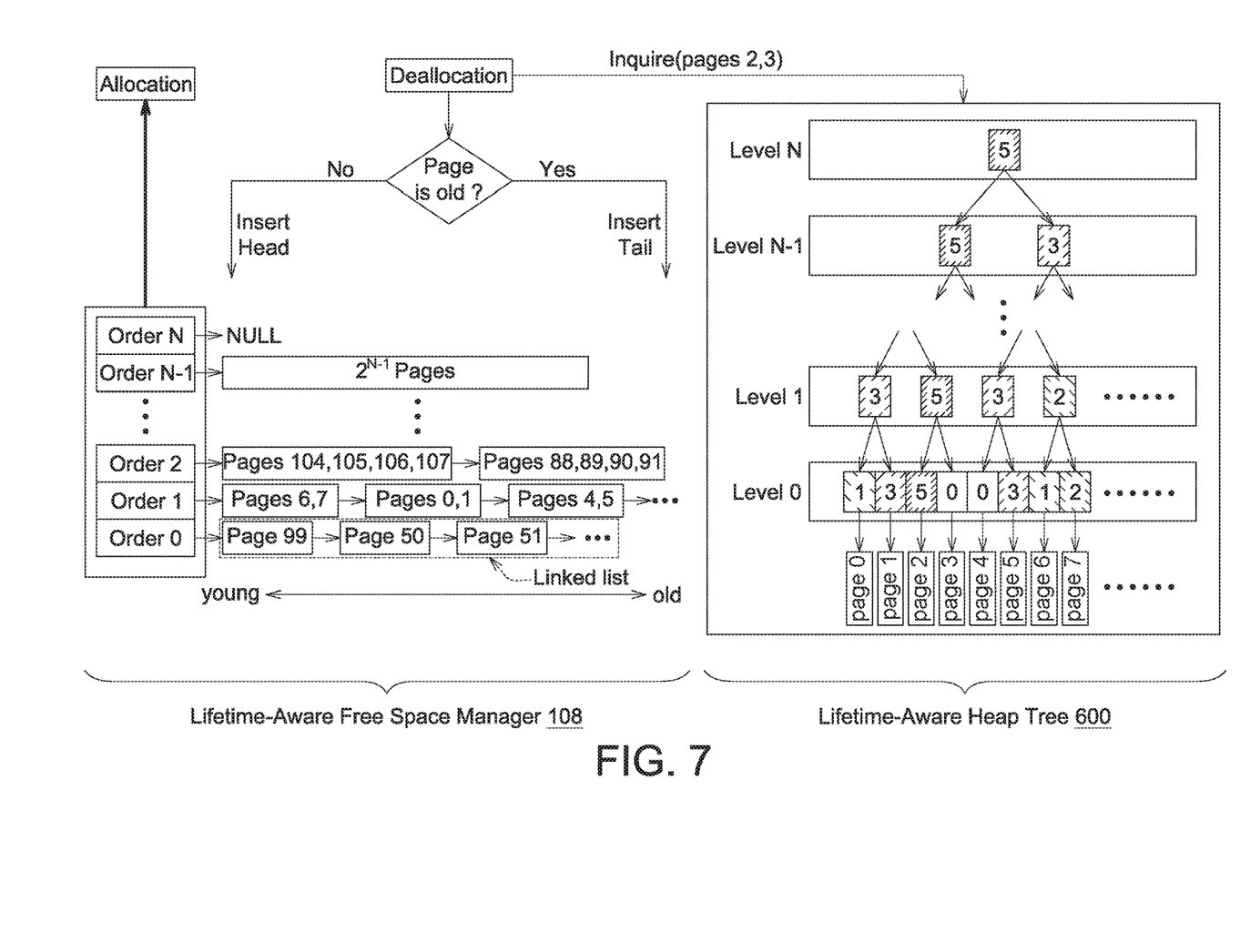
FIG. 7 shows an example to illustrate the free page allocation and the in-used page deallocation with the proposed lifetime-aware free space manager using the lifetime-aware heap tree.

FIG. 7 shows an example to illustrate the free page allocation and the in-used page deallocation with the proposed lifetime-aware free space manager 108 using the lifetime-aware heap tree 600.

The lifetime-aware heap tree 600 may inquire a lifetime value of a deallocated page from the lifetime-aware heap tree 600, and check whether the lifetime value of the deallocated page exceeds a threshold, to determine a position of the deallocated page in a linked list recording pages available for allocation. As discussed above, free pages on a free memory space of the hybrid memory 102 are sorted as nodes of the lifetime-aware heap tree 600 in accordance with respective lifetimes to write.

For example, when the lifetime value of the deallocated page exceeds the threshold (i.e., the deallocated page is identified as an old page), the lifetime-aware free space manager 108 may insert the deallocated page to the tail of the linked list, such that the deallocated page has a lower priority to be allocated as in-used page; conversely, when the lifetime value of the deallocated page does not exceed the threshold (i.e., the deallocated page is identified as a young page), the lifetime-aware free space manager 108 may insert the deallocated page to the head of the linked list, such that the deallocated page has a higher priority to be allocated as in-used page.

In FIG. 7, the free memory space is allocated in the unit of $2^N$ continuous pages, where N is an integer number ranging from 0 to a specified upper limit. For example, the pointer marked with "Order 0" links a number of groups having $2^0$ free page, e.g., the group with page 99, the pointer marked with "Order 1" links a number of groups having $2^1$ continuous free pages, e.g., the group with pages 6 and 7, and so on.

A memory allocation (e.g., the system request in FIG. 1) typically returns the first group in the linked list with a specified order, and a memory deallocation just inserts the group of free pages into the tail of the linked list with the same order.

In the proposed memory deallocation, a page group identified as old shall be inserted to the tail of the corresponding linked list; conversely, a page group identified as young shall be inserted to the head of the corresponding list. In this way, the memory allocation which always retrieves the first group of free pages more likely (resp. less likely) gets young (resp. old) pages.

In this example, if a memory deallocation occurs and will return a group with two continuous pages, e.g., pages 2 and 3, to the lifetime-aware free space manager 108, the return position depends on the lifetime value inquired from the lifetime-aware heap tree 600. If the lifetime value, i.e., 5, is greater than a predefined threshold, e.g., 3, this group of pages shall be inserted to the tail of the linked list of "Order 1". Thus, the allocation of this group of pages which identified as old can be postponed effectively.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A memory management method, comprising:
providing a hybrid memory comprising a first type memory and a second type memory, wherein the first type memory has higher capacity than the second type memory, and the second type memory has higher access efficiency than the first type memory;
providing an inactive list and a read active list for recording in-used pages on the first type memory;
providing a write active list for recording in-used pages on the second type memory;
allocating a page from the first type memory according to a system request, and inserting the page into the inactive list accordingly;
moving the page from the inactive list to the write active list or the read active list in response to two or more successive access operations on the page; and
referring the page to a physical address on the second type memory when the page is in the write active list.

2. The memory management method according to claim 1, wherein the page is assigned for a descriptor which comprises:

a first flag for indicating whether the page is in the write active list or not;
a second flag for indicating whether the page is in the read active list or not; and
a third flag for reflecting the frequency of the access operations on the page.

3. The memory management method according to claim 2, further comprising:
checking whether the third flag of the page is clear when the page is accessed; and
moving the page into the write active list in response to a write operation on the page when the third flag of the page is set and the page is not in the write active list.

4. The memory management method according to claim 3, further comprising:
when the third flag of the page is set and the page is in the read active list or the inactive list, moving the page into the write active list in response to a read operation on the page if a free memory space of the second type memory is sufficient to place the page.

5. The memory management method according to claim 2, further comprising:
checking whether the third flag of the page is clear when the page is accessed; and
setting the third flag of the page when the third flag of the page is clear, except that the page is in the write active list and the page is accessed by a read operation.

6. The memory management method according to claim 2, further comprising:
reclaiming the page when the third flag of the page is clear and the page is in the inactive list for a first period of time;
moving the page into the inactive list when the third flag of the page is clear and the page is in the write active list or the read active list for a second period of time; and
clearing the third flag of the page when the third flag of the page is set and the page has not been accessed for a third period of time.

7. The memory management method according to claim 1, wherein data of the page in the first type memory is copied to a free page on the second type memory when the page is moved from the inactive list or the read active list to the write active list.

8. The memory management method according to claim 1, further comprising:
inquiring a lifetime value of a deallocated page from a lifetime-aware heap tree, wherein free pages on a free memory space of the hybrid memory are sorted as nodes of the lifetime-aware heap tree in accordance with respective lifetimes to write;
checking whether the lifetime value of the deallocated page exceeds a threshold;
inserting the deallocated page to the tail of a linked list recording pages available for allocation when the lifetime value of the deallocated page exceeds the threshold, such that the deallocated page has a lower priority to be allocated as an in-used page; and
inserting the deallocated page to the head of the linked list when the lifetime value of the deallocated page does not exceed the threshold, such that the deallocated page has a higher priority to be allocated as the in-used page.

9. The memory management method according to claim 1, wherein the first type memory is a multi-level-cell (MLC) memory and the second type memory is a single-level cell (SLC) memory.

10. The memory management method according to claim 1, wherein the first type memory is a SLC memory and the second type memory is a dynamic random access memory (DRAM).

11. A memory system, comprising:
a hybrid memory comprising a first type memory and a second type memory, wherein the first type memory has higher capacity than the second type memory, and the second type memory has higher access efficiency than the first type memory;
an inactive list and a read active list for recording in-used pages on the first type memory;
a write active list for recording in-used pages on the second type memory;
a write-aware page manager, configured for:
allocating a page from the first type memory according to a system request, and inserting the page into the inactive list accordingly; and
moving the page from the inactive list to the write active list or the read active list in response to two or more successive access operations on the page; and
a memory management unit (MMU), for referring the page to a physical address on the second type memory when the page is in the write active list.

12. The memory system according to claim 11, wherein the page is assigned with a descriptor which comprises:
a first flag for indicating whether the page is in the write active list or not;
a second flag for indicating whether the page is in the read active list or not; and
a third flag for reflecting the frequency of the access operations on the page.

13. The memory system according to claim 12, wherein the write-aware page manager checks whether the third flag of the page is clear when the page is accessed, and moves the page into the write active list in response to a write operation when the third flag of the page is set and the page is not in the write active list.

14. The memory system according to claim 12, wherein the write-aware page manager checks whether free space of the second type memory is larger than a threshold, moves the page into the write active list in response to a read operation when the free space of the second type memory is larger than or equal to the threshold, and moves the page into the read active list in response to the read operation when the free space of the second type memory is smaller than the threshold.

15. The memory system according to claim 12, wherein the write-aware page manager checks whether the third flag of the page is clear when the page is accessed, and sets the third flag of the page when the third flag of the page is clear except that the page is in the write active list and the page is accessed by a read operation.

16. The memory system according to claim 12, wherein the write-aware page manager reclaims the page when the third flag of the page is clear and the page is in the inactive list for a first period of time;
the write-aware page manager moves the page to the inactive list when the third flag of the page is clear and the page is in the write active list or the read active list for a second period of time; and
the write-aware page manager clears the third flag of the page when the third flag of the page is set and the page has not been accessed for a third period of time.

17. The memory system according to claim 11, wherein data of the page in the first type memory is copied to a free page on the second type memory when the page is moved from the inactive list or the read active list to the write active list.

18. The memory system according to claim 11, further comprising:
   a lifetime-aware free space manager, configured for:
   inquiring a lifetime value of a deallocated page from a lifetime-aware heap tree, wherein free pages on a free memory space of the hybrid memory are sorted as nodes of the lifetime-aware heap tree in accordance with respective lifetimes to write;
   checking whether the lifetime value of the deallocated page exceeds a threshold;
   inserting the deallocated page to the tail of a linked list recording pages available for allocation when the lifetime value of the deallocated page exceeds the threshold, such that the deallocated page has a lower priority to be allocated as an in-used page; and
   inserting the deallocated page to the head of the linked list when the lifetime value of the deallocated page does not exceed the threshold, such that the deallocated page has a higher priority to be allocated as the in-used page.

19. The memory system according to claim 11, wherein the first type memory is a multi-level-cell (MLC) memory and the second type memory is a single-level cell (SLC) memory.

20. The memory system according to claim 11, wherein the first type memory is a SLC memory and the second type memory is a dynamic random access memory (DRAM).

* * * * *